United States Patent [19]

Stow

[11] 4,429,025

[45] Jan. 31, 1984

[54] BATTERY RETAINING DEVICE

[75] Inventor: Mark Stow, Indianapolis, Ind.

[73] Assignee: Masco Corporation of Indiana, Taylor, Mich.

[21] Appl. No.: 429,531

[22] Filed: Sep. 30, 1982

[51] Int. Cl.³ .............................................. H01M 2/10
[52] U.S. Cl. .......................................... 429/97; 429/100
[58] Field of Search .................... 429/96, 97, 98, 100

[56] References Cited

U.S. PATENT DOCUMENTS

| 2,985,704 | 5/1961 | Kempf et al. | 429/98 |
|---|---|---|---|
| 3,088,992 | 5/1963 | Lyman | 429/100 |
| 4,008,356 | 2/1977 | Asano | 429/98 |
| 4,221,450 | 9/1980 | Sears | 429/100 |

Primary Examiner—Donald L. Walton

Attorney, Agent, or Firm—Stephen L. Permut; E. Dennis O'Connor; Leon E. Redman

[57] ABSTRACT

A retaining device suitable for removably interconnecting a battery with the housing of an electrical apparatus. The retaining device has a bracket connected to the housing. The bracket is provided with two stanchions adapted to receive the battery in a battery retention channel therebetween. A small latching channel facing outside of the battery retention channel is formed on one of the stanchions. A clamp having a latch is pivotably connected to the bracket at a location near the other of the stanchions. The assembly is operated by inserting a battery in the battery retention channel, pivoting the clamp until the latch is near the latching channel, and temporarily elastically deflecting the clamp until the latch can be engaged with the latching channel.

16 Claims, 7 Drawing Figures

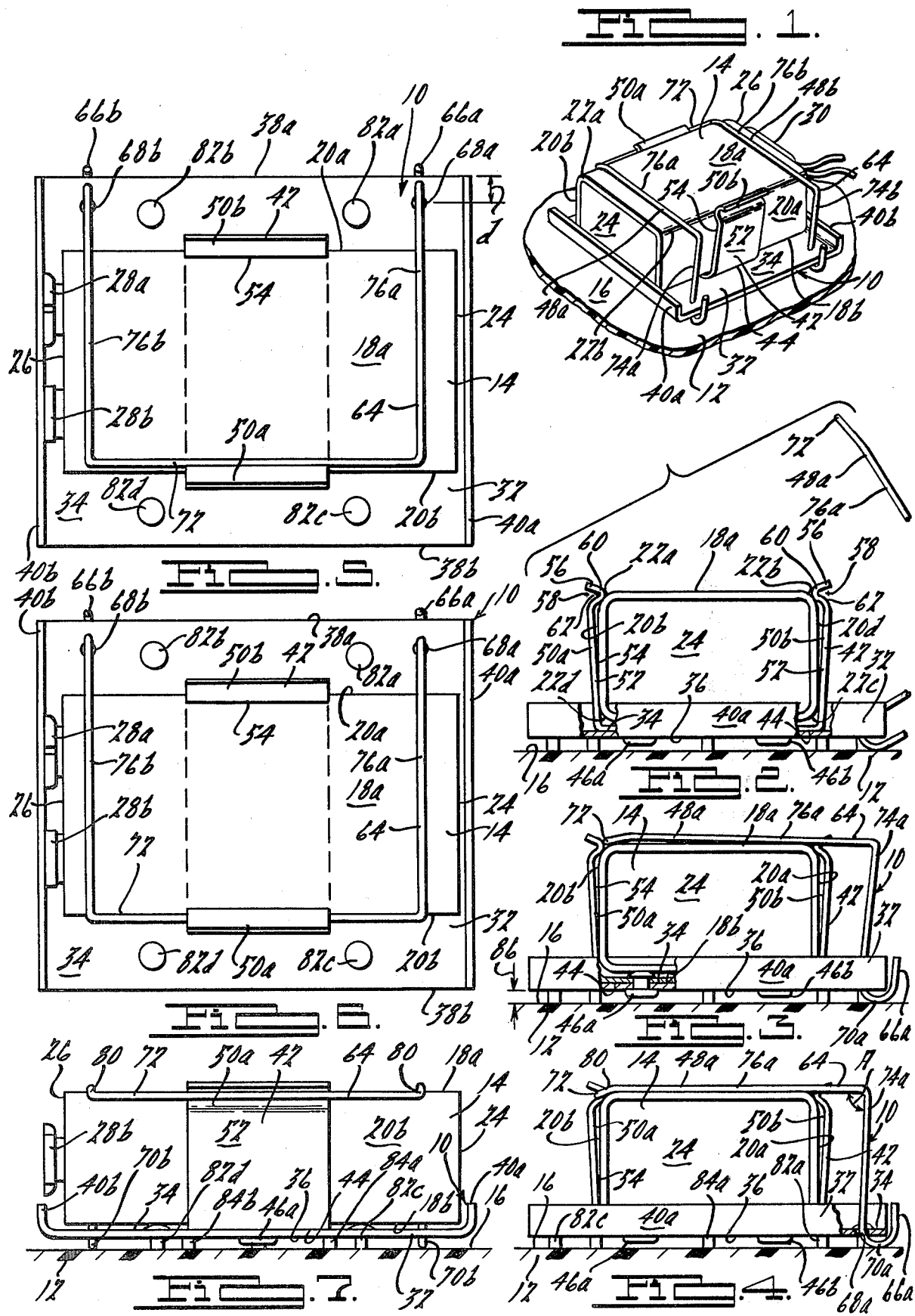

BATTERY RETAINING DEVICE

BACKGROUND

The present invention relates to retaining devices and more particularly to retaining devices suitable for retaining batteries. The retaining device of the present invention is particularly suitable for retaining a rectangular parallelpiped shaped battery, such as a nine volt battery, within a housing of an electrical device requiring such a battery for operation.

Many types of battery retainers having been designed to hold cylindrically shaped or rectangular parallelpiped shaped batteries. Many consist of a U-shaped stamping securing the battery between the arms of the stamping. Others provide a battery compartment which, when closed, completely or nearly completely encloses the battery.

Several devices in current use, such as portable radios and cordless remote telephones are subject to comparatively rough treatment and therefore need a battery retaining device that secures the battery in place against greater forces than the U-shaped stamping alone provides. When a battery moves from the battery retaining device, the electrical connections may also be severed, resulting in a loss of power to the electrical device. Furthermore, if the battery completely separates from the battery retaining device, the battery could move around freely within the housing, causing an undesirable rattling noise and possibly causing damage to components and electrical connections of the electrical device. Nonetheless, considerations of weight, cost and convenience of service dictate against use of a totally enclosed battery compartment for some of these electrical devices. What is needed, therefore, is an inexpensive battery retaining device that is easy to operate and secures the battery against becoming loose when the electrical device is treated roughly.

The object of the present invention is to provide an inexpensive battery retaining device which is easily and manually operable to lock the battery in a desired position within the housing of an electrical apparatus. Another object of the present invention is to provide a battery retaining device which is readily accessible for changing the battery. Still another object of the present invention is to provide a battery retaining device having a latch to secure the battery against substantial forces which would otherwise tend to separate the battery from the retaining device.

SUMMARY

The present invention provides a battery retaining device suitable for removably securing a battery to a housing of an electrical device which requires a battery for operation.

The battery retaining device has a bracket which is connected to the housing in use. The bracket is provided with two stanchions adapted to receive the battery therebetween. The first stanchion is provided with a latching channel facing away from the second stanchion. A clamp is pivotally connected to the bracket at a location near the second stanchion. The clamp has a latch which is pivoted towards and away from the first stanchion when the clamp is pivoted. The battery is secured to the bracket by inserting the battery between the stanchions, pivoting the clamp until the latch is near the first stanchion, elastically deflecting the clamp until the latch clears the stanchion and inserting the latch into the latching channel.

In the preferred embodiment, the clamp is formed of a single piece of wire having two accurate ends each pivotally interconnected to the bracket by being inserted through apertures in the bracket near the edge of the bracket. When the bracket is fastened to the housing, the arcuate ends of the clamp are permanently secured to the bracket by being trapped between the bracket and the housing.

Also in the preferred embodiment, the clamp has two V-shaped portions of wire each extending generally upwardly from one of the arcuate ends and then extending therefrom at an angle of less than ninety degrees (90°) and preferably at an angle of about seventy degrees (70°) towards the first stanchion. The latch is a linear portion of wire formed integrally with the V-shaped portions of the clamp and is generally parallel to the pivot axis of the clamp.

The many objects, features, and advantages of the present invention will become apparent to those skilled in the art when the following detailed description of the preferred embodiment of a battery retention device according to the present invention is read together with the drawings.

BRIEF DESCRIPTION OF THE DRAWING

FIG. 1 is a perspective view of a battery retaining device of the present invention, a nine volt battery and a portion of the housing of an electrical device requiring the nine volt battery for operation, the battery retaining device being shown in its locked condition;

FIGS. 2, 3 and 4 are front views, with parts cutaway, of the battery retaining device and battery of FIG. 1 illustrating the device in an open condition, in a closed but unlatched condition, and in a latched condition, respectively;

FIGS. 5 and 6 are top views thereof, illustrating the device in an closed but unlatched condition and in a latched position, respectively; and FIG. 7 is a side view thereof showing the device in a latched condition.

DETAILED DESCRIPTION OF THE PREFERRED EMBODIMENT

Referring now to the drawing in general and to FIG. 1 in particular, a battery retaining device 10 according to the present invention is illustrated together with a portion of a housing 12 of an electrical device. A nine volt battery 14, well known in the art, is shown retained by the battery retaining device 10.

Only a small portion of the housing 12 having a generally flat surface 16 is illustrated. The electrical device may be any device for which a nine volt battery is suitable. The electrical devices for which the apparatus of the present invention is most suitable are portable or small electrical devices which may receive substantial jostling and jolts which could otherwise separate the battery from the retaining device. Examples of such electrical devices are calculators, radios, two way radios and remote cordless telephone handsets and bases. The surface 16 is usually an inside surface of the housing 12 and may, in use, be oriented in any direction.

The battery 14 illustrated in the drawing and intended to be secured by the retaining device 10 illustrated is a nine volt battery having a standardized parallelpiped shape and size. The battery 14 as shown in FIGS. 2, 3 and 4 has two large rectangular sides 18a and 18b and two smaller rectangular sides 20a and 20b. Four curved edges 22a-d (FIG. 2) are formed between pairs of adjacent rectangular sides. The battery 14 has a flat base portion 24. The battery 14 has a top portion 26 (FIGS. 1, 5, 6 and 7) provided with interconnecting means 28a and 28b (FIGS. 5 and 6) suitable for mechanical and electrical interconnection of the battery with an electrical connector 30 (FIG. 1), well known in the art, to supply power to the electrical device.

The battery retaining device 10 has a base plate 32 which is stamped from a rectangular piece of sheet metal. The base plate 32, as illustrated in FIGS. 5, 6 and 7, has a generally flat main portion having a flat upper surface 34 and a flat lower surface 36 (FIGS. 2, 3 and 4). The main portion of the base plate 32 extends between two oppositely situated flat edges 38a and 38b (FIGS. 5 and 6). The other two edges, 40a and 40b, are upturned.

The battery retaining device 10 also has a bracket 42 which is stamped from an elongated rectangular piece of sheet metal into a U-shaped element, as shown in FIGS. 2, 3 and 4. The bracket 42 has a base portion 44 (FIGS. 2, 3 and 7) which is secured to the upper surface 34 of the base plate 32 near the center of the surface 34 by means of rivets 46a and 46b (FIGS. 2, 3 and 4).

The bracket 42 further has two supports or stanchions 50a and 50b extending upwardly from its base portion 44. Each of the stanchions, 50a or 50b, has a flat main portion 52 (FIGS. 1, 2 and 7). Each of the main portions 52 defines a plane parallel to the edges 38a and 38b of the base plate 32. Each of the main portions 52 forms an angle of no more than ninety degrees (90°) with the base portion 44 of the bracket 42. Preferably the angle formed is slightly less than ninety degrees (90°). The main portions 52 of the stanchions 50a and 50b define therebetween a battery retention channel 54. The battery retention channel 54 (FIGS. 1 through 6) is adapted for the insertion of the battery 14 therein with each of the smaller rectangular sides 18a and 18b adjacent to one of the main portions 52 and with one of the larger rectangular sides 20a or 20b resting against the base portion 44 of the bracket 42.

The uppermost end of each of the stanchions 50a or 50b is provided with a portion 56 having generally cylindrical curvature, best shown in FIG. 2. The center of curvature 58 of the uppermost end of each stanchion 50a or 50b is approximately in the same plane as the main portion 42 of the stanchion. The stanchions 50a and 50b are proportioned such that the center of curvature of the convex surface 60 is slightly above the curved edges 22a and 22b of the battery when the battery is seated in the channel 54 as illustrated in FIG. 2. Thus a portion of each of the stanchions 50a and 50b has a convex surface 60 protruding into the battery retention channel 54 and a concave outer surface 62. The concave surface 62 of one of the stanchions 50a defines a latching channel, as will be described later. The convex inner surface 60 cooperates with two of the curved edges 22a and 22b of the battery 14 to retain the battery in the channel 54. When the battery is inserted into or removed from the channel 54, the convex inner surface cooperates with the other two curved edges 22c and 22d to cam the stanchions 50a and 50b away from the battery.

A spring 64 is pivotally connected to the base plate 32. The spring 64 is comprised of a length of spring steel wire having ends 66a (FIGS. 3 through 6) and 66b (FIGS. 5 and 6). The spring 64 is bent and curved, as described below and illustrated in the drawing, at several locations intermediate the ends 66a and 66b.

The base plate 30 is provided with two spaced apart apertures 68a (FIGS. 4, 5 and 6) and 68b (FIGS. 5 and 6) for the spring 64. Each of the apertures 68a and 68b is spaced the same preselected distance, indicated by "d" in FIG. 5, from the edge 38a of the base plate 30. A short distance from each of the ends 66a and 66b of the spring 64, the spring is provided with a semicular arcuate portion 70a and 70b (FIGS. 4 and 7) having a radius of curvature slightly greater than half of "d." Each of the ends 66a and 66b is inserted into one of the apertures 68a and 68b until the arcuate portions 70a and 70b are partly passed through the apertures. The ends 66a and 66b of the spring 62 are trapped between the housing 12 and the base plate 30 when the base plate 30 is secured to the housing (FIGS. 2, 3, 4 and 7), in a manner to be described shortly.

The spring 64 is pivotable relative to the base about an axis which is parallel to the edge 38a of the base plate 30 and located generally between the edge 38a and the apertures 68a and 68b. The spring 62 is designed so that when it is pivoted as far as it will go towards the battery 14, a linear portion or latch 72 of the spring will rest on or near the top edge of the battery furthest from the spring, shown in the drawings as edges 22b (FIGS. 3 and 4).

Similar portions 48a and 48b (FIG. 1) of the spring 62 extends between each of the arcuate portions 70a and 70b near the ends of the spring and the latch 72. These portions 48a and 48b of the spring for the latch, are generally parallel V-shaped supports. Each of the portions 48a and 48b has a first portion 74a or 74b (FIGS. 1 through 4) extending generally upwardly from the arcuate portions 70a or 70b and a second portion 76a or 76b (FIGS. 1 through 6) extending generally horizontally from the uppermost end of the first portion to the latch 72. The angle A (FIG. 4) formed at each apex 78a or 78b between the first portions 74a or 74b and the second portions 76a or 76b is no greater than ninety degrees (90°) and is preferably approximately seventy degrees (70°). The ends of the second portions 76a or 76b of the arms which are interconnected with the latch 72 may be curved downwardly as shown at 80 in FIGS. 4 and 7 in the drawing, to generally match the contours of the battery 14 and to assist in the locking operation, described later.

The battery retaining device 10 is secured to the housing 12 as shown in FIGS. 5 and 6 by fastening means 82a through 82d. In the drawing illustrated, the housing 12 is plastic and the fastening means 82a through 82d each consist of a plastic cylindrical mounting tab formed integrally with the surface 16 housing 12 and extending upwardly therefrom. The tabs 82a or through 82d are inserted into apertures in the base plate 30 and have been heated to expand and flatten their ends to permanently secure the base plate to the housing 12.

It should be noted here that additional tabs 84a and 84b (FIGS. 4 and 7) are provided in the surface 16 of the housing 12 to assure that there is a small gap 86 between the inner surface 16 of the housing 12 and the lower surface 36 of the base plate 30. The gap is sufficient to permit the spring 64 to pivot but is small enough to inhibit inadvertant separation of the spring from the base plate 30.

In operation, the spring 64 may be pivoted away from the battery 14 to the position illustrated in FIG. 2 for removal or insertion of batteries into the battery retention channel 54.

To lock the battery within the battery retention channel 54, the spring 64 is pivoted to the position illustrated in FIGS. 3 and 5 wherein the latch 72 is resting partly on the edge of the battery 14 and partly on the convex surface 60. The spring is then elastically deflected by manual pressure on the upper ends of the first portions 74a and 74b of the supports 48a or 48b of the spring to advance the latch 72 beyond the stanchion 50b. A slight upward pressure may be necessary on the latch 72 to permit it to clear the lower portion of the concave surface 62.

Once the latch 72 has cleared the lower portion of the concave surface 62 continued pressure on the supports 48a and 48b will cam the latch over the concave surface 62. When the spring 64 is relaxed, the latch 72 is permitted to rest within the concave portion 62 of stanchion as illustrated in FIGS. 1, 4 and 7. The arm portions 76a and 76b secure the battery 14 against removal from the battery retention channel 14. The battery is also inhibited against translational movement within the battery retention channel by the spring 64 since the spring biases the stanchion 50a towards the stanchion 50b.

It is readily apparent that the present invention provides an inexpensive battery retaining device which is easily and manually operable, is readily accessible for changing the battery and secures the battery against becoming loose in the event of jolts which might otherwise loosen the battery.

The above constitutes a detailed description of the best mode contemplated by the inventor at the time of filing for carrying out the invention. Variations and modifications of the embodiment described will be apparent to those skilled in the art and are intended to be included within the scope of the claims.

What is claimed as novel is as follows:

1. A battery retaining device for removable mechanical interconnection of a battery having a longitudinal axis with a housing of an electrical apparatus requiring said battery for operation, said retaining device comprising:
    a bracket adapted to be attached to the housing;
    a pair of stanchions fixedly interconnected with said bracket, each stanchion extending outwardly from said bracket generally parallel to each other and terminating in free ends,
    a battery retention channel formed between said stanchions approximating the cross-sectional shape of a portion of said battery and adapted to receive said battery wherein with its longitudinal axis lying between said stanchions;
    a clamp support element pivotally fastened to said bracket near one of said stanchions such that said element is pivoted about an axis parallel to said longitudinal axis towards and away from the other of said stanchions;
    clamp engaging means near said free end of said other stanchion;
    a clamp interconnected with said clamp support element such that, when said element is pivoted fully towards said other stanchion, said clamp is near said clamp engaging means and
    elastic spring means between clamp and said clamp support element whereby said clamp may be removably interconnected with said clamp engaging means by temporary elastic deflection of said spring means and whereby said spring means biases said other stanchion towards said battery.

2. The battery retaining device of claim 1 wherein said bracket comprises a plate adapted to be attached to said housing and a U-shaped bracket having a base portion interconnected with said plate and two arms extending outwardly from said base portion, said arms comprising said stanchions.

3. The battery retaining device of claim 1 wherein said bracket comprises at least one sheet metal stamping and wherein said clamp engaging means comprises a channel stamped in the free end of said other stanchion.

4. The battery retaining device of claim 1 comprising two of said clamp support elements and further wherein each of said clamp support elements comprise a wire section having two ends, one of said ends being pivotally connected to said bracket and the other of said ends being interconnected with said clamp.

5. The battery retaining device of claim 4 wherein said bracket comprises at least one thin rectangular portion having an edge parallel to said longitudinal axis of said battery, said portion being disposed a short distance above and parallel to said housing when said bracket is attached thereto, said portion is provided with two spaced apart apertures near the edge and portions of said wire sections near said one end thereof are curved and are inserted into one of said apertures whereby said curved portion of each wire section pivots around the material of said portion of said bracket between said edge and said apertures.

6. The battery device of claim 5 wherein said one curved portion of said wire sections are trapped between the bracket and the housing whereby said clamp supports may not be separated from said bracket without deflecting said ends of said wire.

7. The battery retaining device of claim 4 wherein said clamp support elements and said clamp comprise a single length of wire pivotally connected at both of its ends to said bracket.

8. The battery retaining device of claim 7 wherein said wire has first portions comprising said clamp support elements extending generally outwardly from each of said ends, second portions extending from said first portion toward said other stanchion and forming an angle of less than 90° with said fast portions, and a third portion comprising said clamp extending between said second portions, and wherein said spring means comprises the elastic deflection characteristic between said first and said second portion.

9. The battery retaining device of claim 8 wherein said angle is approximately 70°.

10. A battery retaining device for removable mechanical interconnection of a battery having a longitudinal axis and a rectangular cross-section with a housing of an electrical apparatus requiring said battery for operation, said battery retaining device comprising:
    a bracket adapted to be attached to the housing said bracket comprising a base portion, a pair of stanchions extending from said base portion, and terminating in free ends, clamp engaging means formed at the free end of one of said stanchions, a battery retention channel formed between said stanchions approximating the rectangular cross-sectional shape of said battery and adapted to receive said battery therein and a clamp mounting portion of said bracket extending from said base portion near the other of said stanchions and extending therefrom generally away from said channel; and a clamping wire formed from a single length of wire having two ends each pivotally fastened to said clamp mounting portion of said bracket and pivoted with respect to said portion about an axis parallel to the longitudinal axis of the battery, clamp supporting portions near each of the ends and extending generally linearly away therefrom, intermediate portions extending generally linearly away from each of the support portions towards said one stanchion and forming an angle with the support portion of less than 90°, and a clamp portion intermediate the clamp supporting portions extending generally parallel to the longitudinal axis of the battery;

whereby said clamp may be removably interconnected with said clamp engaging means by temporary elastic deflection of said spring means, said spring means biasing said one stanchion towards said battery when said clamp is engaged with said clamp engaging means.

11. The battery retaining device of claim 10 wherein said bracket comprises a plate adapted to be attached to said housing and a U-shaped bracket having a base portion interconnected with said plate and two arms extending outwardly from said base portion, said arms comprising said stanchions.

12. The battery retaining device of claim 10 wherein said bracket comprises at least one sheet metal stamping and wherein said clamp engaging means comprises a channel stamped in the free end of said other stanchion.

13. The battery retaining device of claim 10 wherein said bracket comprises at least one thin rectangular portion having an edge parallel to said longitudinal axis of said battery said portion being disposed a short distance above and parallel to said housing when said bracket is attached thereto, said portion is provided with two spaced apart apertures near the edge and portions of said wire proximate said ends thereof are curved and are inserted into one of said apertures whereby said curved portion of wire pivots around the material of said portion of said bracket between said edge and said apertures.

14. The battery retaining device of claim 13 wherein said wire is provided with a partial circular curve spaced a short distance from the ends of the wire whereby said clamp support elements may be connected with said bracket is attached to said housing and whereby said clamp supports may not be separated from said bracket without deflecting said ends of said wire.

15. The battery retaining device of claim 14 wherein said bracket comprises at least one sheet metal stamping and wherein said clamp engaging means comprises a channel stamped in the free end of said other stanchion.

16. The battery retaining device of claim 10 wherein said angle is approximately 70°.

* * * * *